United States Patent [19]

Pyhälammi et al.

[11] Patent Number: 5,088,112
[45] Date of Patent: Feb. 11, 1992

[54] INTERFACE UNIT

[75] Inventors: Seppo Pyhälammi, Helsinki; Matti Reini, Espoo, both of Finland

[73] Assignee: Nokia Data Systems Oy, Mikonkatu 15 A, SF-00100 Helsinki, Finland

[21] Appl. No.: 435,446

[22] Filed: Nov. 21, 1989

[30] Foreign Application Priority Data

Jun. 30, 1988 [FI] Finland .................. 883131

[51] Int. Cl.$^5$ .................. H04B 3/00; H04L 25/00
[52] U.S. Cl. .................. 375/36; 375/121
[58] Field of Search .................. 375/7, 8, 36, 121; 340/825.21, 825.5; 455/607

[56] References Cited

U.S. PATENT DOCUMENTS

| | | | |
|---|---|---|---|
| 4,390,967 | 6/1983 | Eglowstein | 340/825.21 |
| 4,603,320 | 7/1986 | Farago | 375/121 |
| 4,607,379 | 8/1986 | Marshall et al. | 375/121 |
| 4,734,696 | 3/1988 | Rogers | 340/825.510 |
| 4,751,699 | 6/1988 | Tarridec et al. | 370/84 |
| 4,764,939 | 8/1988 | Rogers | 375/36 |
| 4,785,465 | 11/1988 | Lang et al. | 375/7 |
| 4,852,041 | 7/1989 | Nakano | 375/121 |

FOREIGN PATENT DOCUMENTS

| | | |
|---|---|---|
| 0228213 | 7/1987 | European Pat. Off. . |
| 3411512A1 | 10/1984 | Fed. Rep. of Germany . |
| 3710616 C1 | 3/1988 | Fed. Rep. of Germany . |

Primary Examiner—Stephen Chin
Attorney, Agent, or Firm—Finnegan, Henderson, Farabow, Garrett and Dunner

[57] ABSTRACT

The invention relates to an interface unit intended to be connected to a parallel connection of a data communication equipment (DCE) or a terminal equipment (DTE). The interface unit comprises multiplexers means (52, 54) for multiplexing connection signals to serial form and vice versa. In the invention, the multiplexers means (52, 54) are connected to parallel connection signals through I/O device (51) comprising an I/O line (L1 . . . L16) for each connection signal. At least some of the I/O lines are automatically selectable as an input or an output and/or connectable to at least two alternative inputs or outputs in the multiplexer (52, 54) for achieving cross-connections, depending on whether the interface is connected to the terminal equipment (DTE) or to the data communication equipment (DCE).

9 Claims, 3 Drawing Sheets

INTERFACE UNIT

BACKGROUND OF THE INVENTION

1. Field of Invention

The invention relates to an interface unit, and more particularly to an interface unit connectible to a parallel interface of data communication equipment or to a parallel interface of data terminal equipment.

2. Discussion of Related Art

A data communication system comprises a data communication equipment (DCE) and a data termination equipment (DTE), as shown in FIG. 1. Various data interfaces have been developed for different applications of the DCE. Most of these interfaces are internationally standardized. Such electrical and functional interfaces include the standards V.28, V.11, V.35, X.21 or G.703 of CCITT. These standard interfaces differ from each other with respect to their use, because various speed requirements have produced a great variety of electrical realizations requiring varying numbers of parallel connection signals and mechanical terminals of different kinds.

A frequent problem with data communication systems comprising several different interfaces is the small maximum range of transmission (e.g. 10 m), as a result of which the data terminal equipment has to be disposed close to the data communication device even though a considerably greater range of transmission would often be required.

Moreover, all signals in a typical standard interface are in parallel form, and, at worst, a connection cable, such as the connection cable 21 in FIG. 2, may comprise tens of parallel conductors. A cable of this kind is expensive and difficult to install.

In an attempt to solve these problems, U.S. Pat. No. 4,734,696 suggests that instead of being transmitted in parallel form, as usual, connection signals should be converted into series form outside the device through time-division multiplexing with a separate unit, and transmitted in serial form from the data communication equipment through a connection cable into an interface unit disposed in the immediate vicinity of another device to the attached to it. In the interface unit, the serial signal is again converted into a parallel connection signal which is applied to the other device.

However, there remains the problem that either a data terminal equipment DTE directly or another data communication equipment DCE, such as a modem, can be connected to the data communication equipment DCE. In FIG. 1, for example, a terminal equipment 5 and a modem 6 are connected directly to a data communication equipment 4. This causes problems in the matching of the interface with the equipments, as the connection of the connection signals is different in both cases. This requires several different interface units or modifications to be carried out at the installation step.

SUMMARY OF THE INVENTION

This problem is solved by an interface unit which is connectible in the alternative both to a parallel interface of data communication equipment and a parallel interface of data terminal equipment which comprises multiplexing means connected to parallel connection signals through an I/O equipment which automatically connects the connection signals to the multiplexing means in different ways, depending on whether the connection is to be made to the data terminal equipment (DTE) or to the data communication equipment (DCE). This enables the use of one and the same interface unit (terminal) for both equipment types (DCE and DTE).

The invention will now be described in greater detail by means of preferred embodiments of the invention with reference to the attached drawings.

DETAILED DESCRIPTION OF THE PREFERRED EMBODIMENTS

Figure 3:
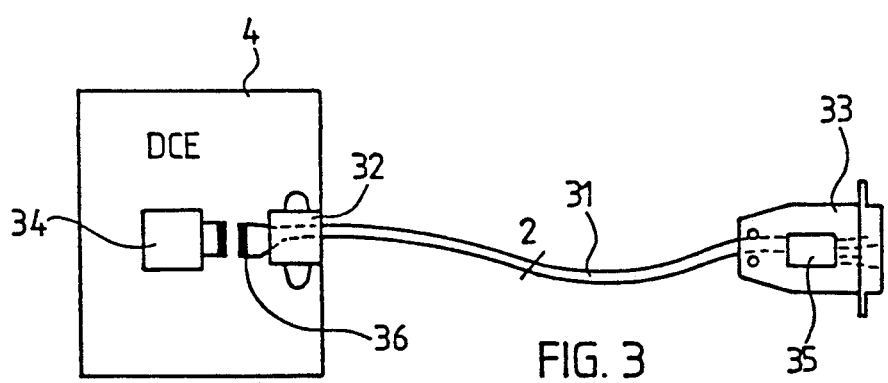
FIG. 3 shows a data communication equipment according to the invention with an interface unit according to the invention.

Referring to FIG. 3 shows a data communication equipment 4 comprises an interface unit according to the invention. The interface unit is disposed outside the equipment at the end of a connection cable. The data communication equipment 4 comprises an integral multiplexer and serial transmission unit 34 which converts the internal logic-level data and control signals of the equipment 4 through time-division multiplexing into serial signals which are applied to the interface unit. Correspondingly, the multiplexing unit 34 converts the serial signal received from the interface unit into parallel signals which are applied to the internal signal buses of the equipment 4. A serial transmission port in the unit 34 is connected through a separation transformer 36 or another separation means to a terminal 32 in the data communication equipment 4. A galvanic separation is formed between the unit 34 and the terminal 32 by means of the separation transformer 36. The terminal 32 can be of any suitable type, depending of the type of a connection cable 31 used and the serial transmission technique applied. The two-conductor connection cable 31 is connected to the terminal 32 by means of a counterpart terminal (not shown). An interface unit 35 according to the invention is disposed in a terminal 33 and connected to one end of the connection cable 32. In this way, it is always possible to use the same type of interface at the end of the data communication equipment while transition to an interface type used by another equipment can be made easily by selecting a suitable interface unit.

The terminal 33 conforms mechanically and electrically to the interface standard applied by another equipment to be connected to the data communication equipment 4, such as a terminal equipment 5 or another data communication equipment 6. Accordingly, the terminal 33 matches with the terminal in the equipment 5 or 6. The interface unit 35 comprises a multiplexer and serial transmission unit which corresponds to the unit 34 in the data communication equipment and converts the received serial signal into logic-level control, clock and data signals. The interface unit 35 may further comprise a connection circuit which converts the logic-level signals into a form conforming electrically and functionally to the interface standard applied by the terminal equipment 5, in which form the signals are applied through the terminal 33 into the terminal of the terminal equipment 5.

Figure 5:
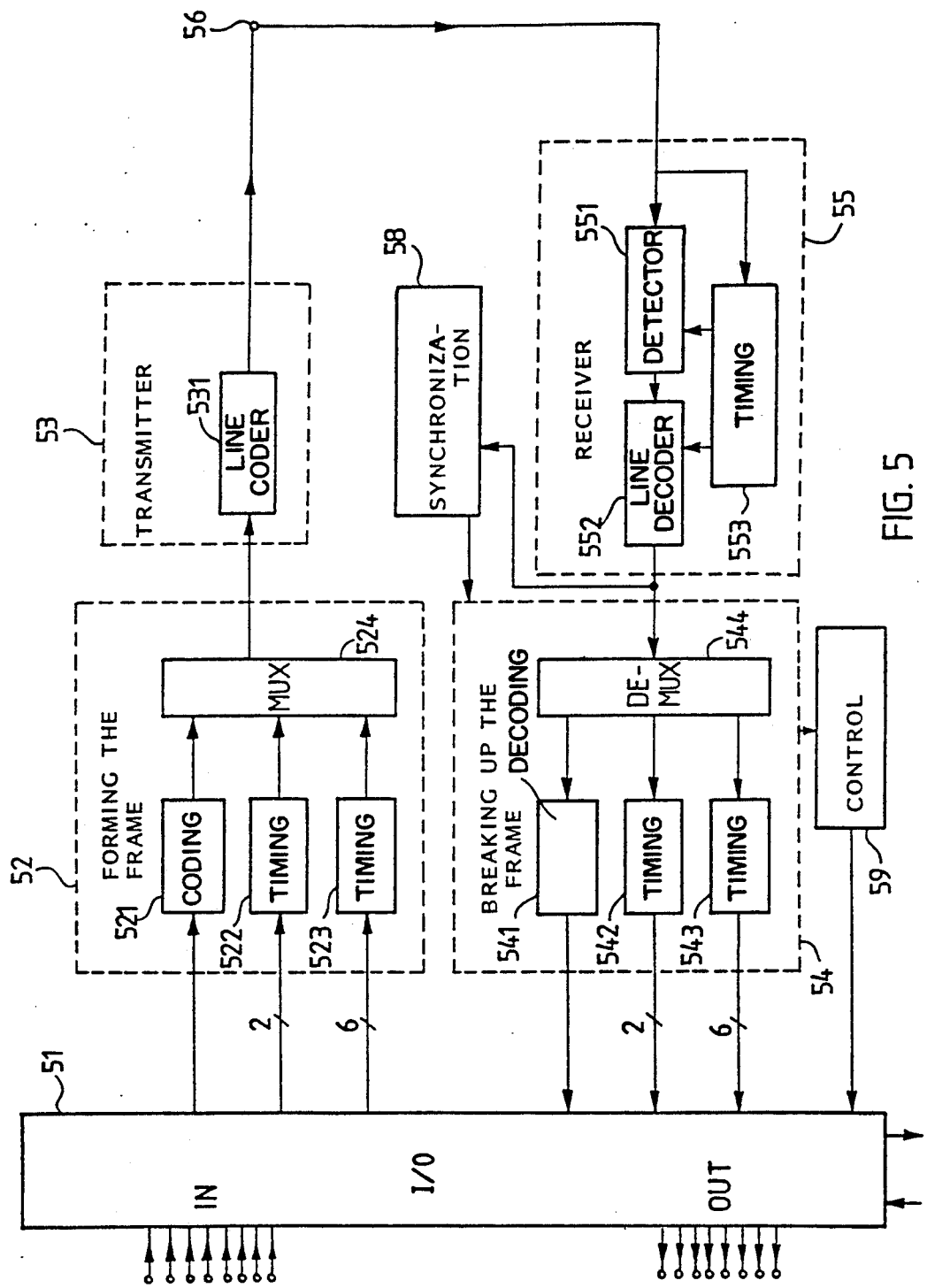
FIG. 5 shows the block diagram of a multiplexer and serial transmission unit.
Figure 7:
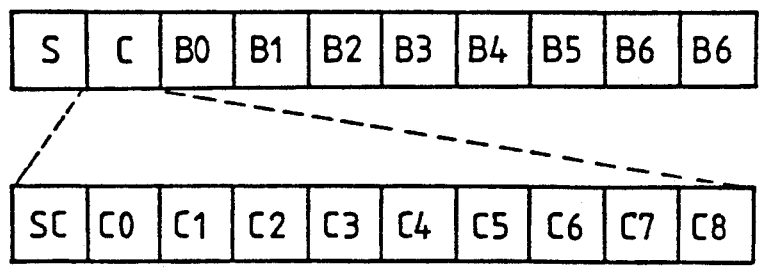
FIG. 7 illustrates the frame structure of the serial signal according to the invention.

FIG. 5 shows a more detailed block diagram of the multiplexer and serial transmission unit 34 or 35. The unit 34 or 35 comprises a multiplexing circuitry 52 and a demultiplexing circuitry 54. The multiplexing circuitry 52 comprises one data input, two parallel clock inputs, and six parallel control inputs. The demultiplexing circuitry 54 comprises a corresponding number of parallel data, clock and control outputs. The data signal to the multiplexing circuitry 52 is coded in a coding block 521 before being applied to the multiplexer 524. The two clock signals and six control signals to be applied to the multiplexing circuitry 52 are matched in time with respect to the data signal at the blocks 522 and 523, respectively, taking into consideration their information content and transmission rate requirement. Output signals from the blocks 521, 522 and 523 are applied to the multiplexer 524, which converts parallel signals to serial form by conventional time-division multiplexing. The multiplexer 524 may form, e.g., the frame shown in FIG. 7, comprising a synchronizing bit S; time intervals B0 . . . B7 for the transmission of data and clocks; and a time interval C for signals of lower level, that is, slower signals. The time interval C for the lower level further comprises a lower-level synchronizing bit SC and time intervals C0 . . . C8 for the transmission of slow control signals.

The serial output signal from the multiplexer 524 is applied to a transmitter 53 which preferably subjects the serial signal to line coding at the block 531. The transmitter 53 may be, e.g., a band frequency modem or an optical transmitter. The output signal from the transmitter 53 is applied to a line 56.

The serial signal from the line 56 is received by a receiver 55 comprising detecting 551, decoding 552 and timing 553 of the received signal. The output signal from the receiver 55 is applied to the demultiplexing circuitry 54, in which the demultiplexer 544 breaks up the frame of the serial signal, forming parallel data, clock and control signals. At the blocks 541, 542 and 543, these signals are subjected to operations opposite to those performed by the blocks 521, 522 and 523 of the multiplexing circuitry 52.

The interface unit 35 further comprises an I/O circuit 51 for connecting the inputs of the multiplexing circuitry 52 and the outputs of the demultiplexing circuitry 54 to parallel connection signals, that is, for instance, to the pins of the terminal 33. The I/O circuit 51 comprises two-way I/O lines the number of which corresponds to that of the inputs of the multiplexing circuitry 52 and the outputs of the demultiplexing circuitry 54. Some or each one of the I/O lines are selectively connectable to any one of said inputs or outputs or at least to two alternative outputs and inputs. This makes it possible to make automatically the various cross-connections required by different interfaces.

Figure 6:
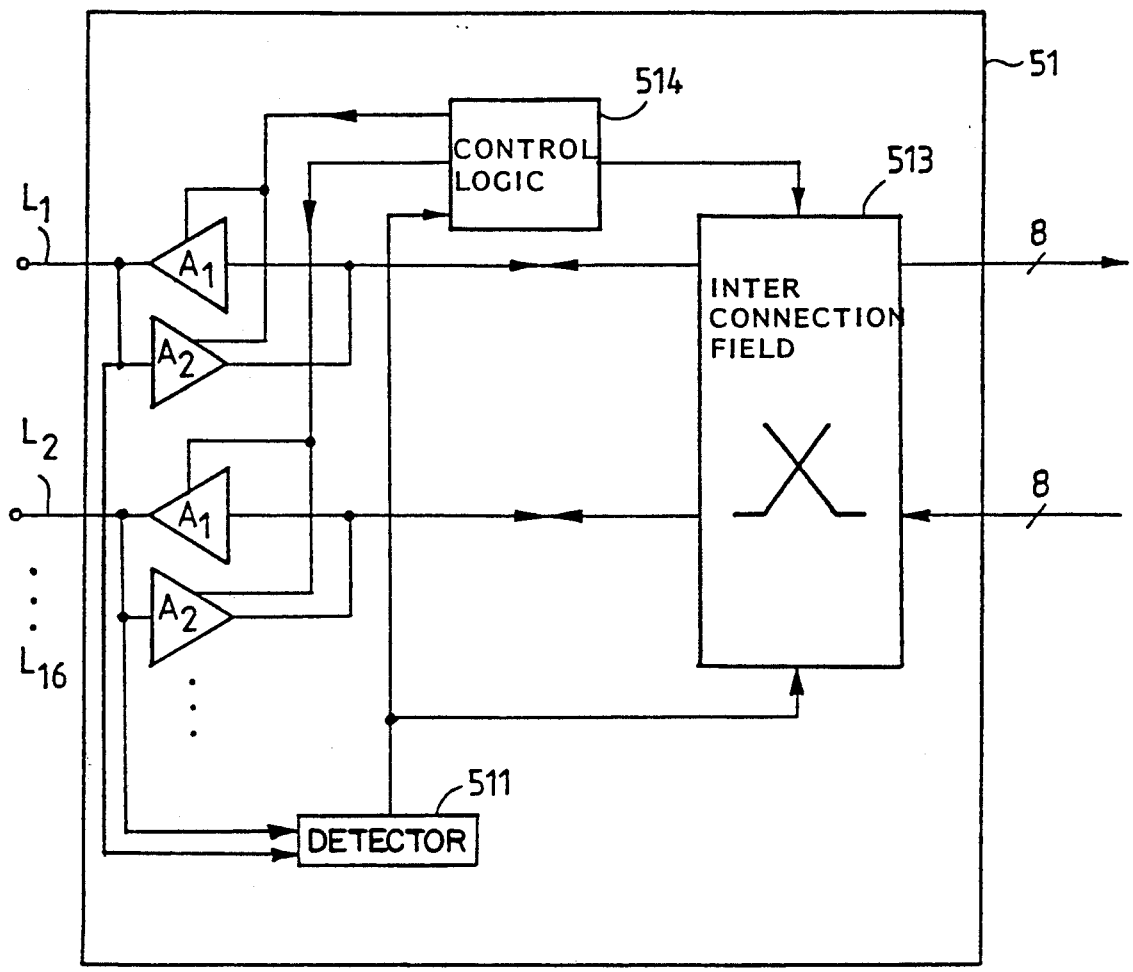
FIG. 6 shows a more detailed block diagram of the I/O circuit of FIG. 5.

The internal structure of the circuit 51 is shown in greater detail in FIG. 6. In this specific case, each I/O line L1, L2, . . . L16 comprises two reversely parallel-connected buffer amplifiers A1 and A2 which are controllable by a control logic 514 in such a manner that one of the amplifiers A1 and A2 is in operation while the other is out of operation. In this way, it can be selectively determined which lines out of the sixteen lines L1 to L16 are inputs and which are outputs. The buffer amplifiers A1 and A2 are further connected to an interconnection field 513 which under the control of the control logic 514 connects each one of the lines L1 to 16 to act as a certain input of the multiplexing circuitry 52 or as a certain output of the demultiplexing circuitry 54. This selection operation is controlled with a detector circuit 511. The detector circuit 511 comprises two inputs connected to two lines, in this particular case to the lines L1 and L2, in which the signal directions are known to be opposite to each other and are reversed at the transition from the terminal equipment interface to the data communication equipment interface. The fact that the output impedance of the transmitter (e.g., A1) is low (from 100 to 300 Ohms) and the output impedance of the receiver (e.g., A2) relatively high (3 to 7 kiloohms) is utilized in the measuring. The measuring is initiated by causing the lines L1 and L2 to act as inputs, whereby the high impedance of the receiver A2 is visible on the lines on the side of the I/O circuit. Thereby the impedance level measured by the detector circuit 511 from the lines is high if a receiver is connected to the line on the side of the device, too, and correspondingly low if a transmitter is connected to the line on the side of the device. The impedance measurement may give three different results: L1 low and L2 high; L1 high and L2 low, and L1 high and L2 high. The first two results indicate that the device in question is a terminal equipment or a data communication equipment. The last result indicates that the interface unit is not connected to any device. By observing the impedance level of one or more lines L1 to L16, it can be automatically determined whether the device to which the interface unit is to be attached is a terminal equipment DTE or a data communication equipment DCE, on the basis of which the control logic 514 is controlled automatically so that it carries out the required cross-connection of signals, which previously has required installation of a new connection cable or some other laborious step.

The I/O circuit of the invention also provides very high flexibility, when the multiplexing unit 34 is matched with various data communication equipments, terminals, interfaces, etc.

The I/O circuit preferably also provides electrical matching, i.e., the voltage levels of the I/O lines are equivalent to the voltage levels of the interface standard applied by the device.

Figure 1:
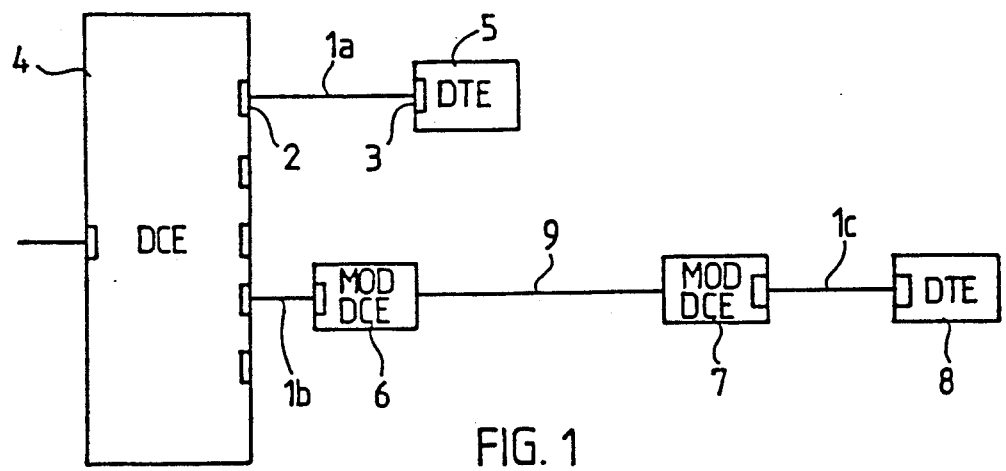
FIG. 1 shows an example of a data communication system comprising several data communication equipments and data terminal equipments.
Figure 2:
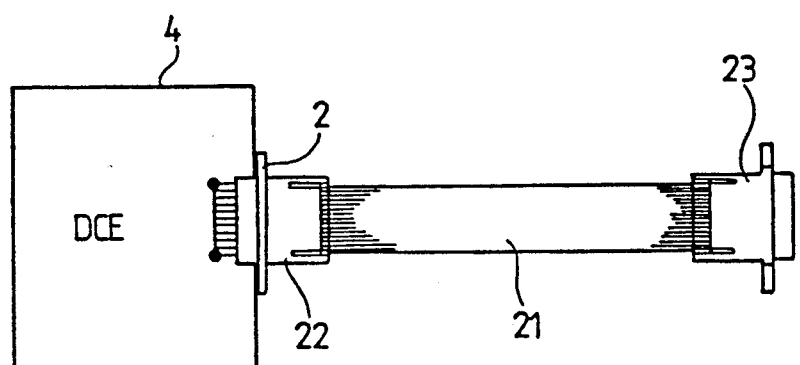
FIG. 2 shows a prior art connection cable solution.
Figure 4:
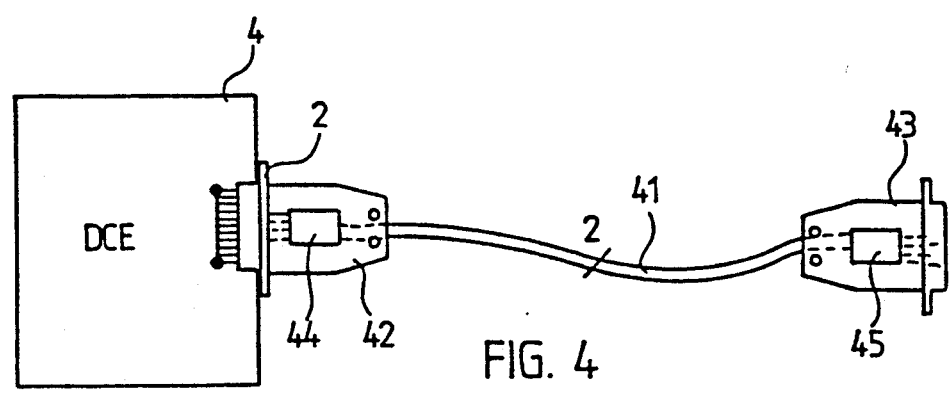
FIG. 4 shows a data link formed by interface units according to the invention.

FIG. 4 shows a data link realized by interface units according to the invention. The data link comprises two terminal units 42 and 43 which are interconnected by a serial connection cable 41, a twin cable or an optical cable, for instance. Interface units 44 and 45 contained in the terminal units 43 and 42 correspond to the interface unit 35 shown in FIG. 3. The terminal units 42 and 43 may conform to different interface standards so that they differ from each other mechanically. Correspondingly, the interface units 44 and 45 may form standard interfaces of different types. In this way the data link according to the invention enables the interconnection of two devices having different interfaces and the serial transmission of connection signals between the devices. If the interfaces of the devices are similar, the data link according to the invention replaces, e.g., the multi-conductor connection cable shown in FIG. 2.

The figures and the description relates thereto are only intended to illustrate the present invention. In its details, the interface unit according to the invention may vary within the scope of the attached claims.

We claim:

1. An interface unit connectible in the alternative to both a parallel interface of data communication equipment and a parallel interface of terminal equipment, said interface unit comprising:

a serial transmission connection;

multiplexing means for multiplexing parallel interface signals including timing, control, and data signals into serial signals for application to the serial transmission connection;

demultiplexing means for demultiplexing serial signals including timing, control and data signals received from the serial transmission connection into parallel interface signals; and I/O means for connecting the parallel interface signals to the multiplexing means and demultiplexing means, and I/O means including, a plurality of I/O lines connectible to the parallel interface signals of either the data communication equipment or the terminal equipment;

means for forming selectively at least a portion of the plurality of I/O lines into either input or output lines, means for switching at least a portion of the I/O lines to either inputs or outputs of the multiplexing means and demultiplexing means, said selecting means and switching means being governed in accordance with the connection of the interface unit to either the terminal equipment or the data communication equipment.

2. An interface unit according to claim 1, wherein the transmission connection is a galvanic connection.

3. An interface unit according to claim 2, wherein the transmission connection is a two-conductor cable.

4. An interface unit according to claim 1 or 2, further comprising a transformer coupling the interface unit to the transmission connection.

5. An interface unit according to claim 1, wherein the transmission connection is an optical cable.

6. An interface unit according to claim 1, further comprising first and second similar connecting terminals, said first connecting terminal for mounting to either one of the data communication equipment or terminal equipment, said second connecting terminal housing the interface unit.

7. An interface unit connectible in the alternative to both a parallel interface of data communication equipment and a parallel interface of terminal equipment, said interface unit comprising:

multiplexing means for multiplexing parallel interface signals including timing, control and data signals, into serial signals for application to a serial transmission connection;

demultiplexing means for demultiplexing the serial signals including timing, control and data signals received from said serial transmission connection into parallel interface signals; and I/O means for connecting the parallel interface signals to the multiplexing means and the demultiplexing means according to a first mode upon connection of the interface unit to the parallel interface of the data communication equipment and according to a second mode upon connection of the interface unit to the parallel interface unit of the terminal equipment.

8. An interface unit connectible in the alternative to both parallel interface of data communication equipment and a parallel interface of terminal equipment, said interface unit comprising:

multiplexing means for multiplexing parallel interface signals into serial signals for application to a serial transmission connection;

demultiplexing means for demultiplexing the serial signal received from the serial transmission connection into parallel interface signals;

means for detecting the connection of the interface unit to the interface of the data communication equipment and the connection of the interface unit to the interface unit of the terminal equipment; and I/O means responsive to said detecting means for interconnecting the parallel interface signals with the multiplexing means and the demultiplexing means in a first mode in response to the connection of the interface unit to the interface of the data communication equipment, and in a second mode in response to the connection of the interface unit to the interface of the terminal equipment.

9. An interface unit according to claim 8, wherein said selecting means comprises means for measuring the impedance level in at least one of said I/O lines.

* * * * *